(12) United States Patent
Chen et al.

(10) Patent No.: US 8,837,572 B2
(45) Date of Patent: Sep. 16, 2014

(54) RECEIVER AND METHOD FOR EQUALIZING SIGNALS

(75) Inventors: Weizhong Chen, Austin, TX (US); Noam Zach, Ganey Tikva (IL); Gideon Kutz, Ramat-Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 171 days.

(21) Appl. No.: 13/508,066

(22) PCT Filed: Nov. 26, 2009

(86) PCT No.: PCT/IB2009/055360
§ 371 (c)(1),
(2), (4) Date: May 4, 2012

(87) PCT Pub. No.: WO2011/064619
PCT Pub. Date: Jun. 3, 2011

(65) Prior Publication Data
US 2012/0230386 A1    Sep. 13, 2012

(51) Int. Cl.
*H03H 7/30* (2006.01)
*H04B 7/08* (2006.01)

(52) U.S. Cl.
CPC .................. *H04B 7/0845* (2013.01)
USPC ........... 375/234; 375/229; 375/230; 375/232; 375/233; 375/316; 375/343; 375/350; 455/63.1; 455/67.13; 455/114.2; 455/296; 455/501; 370/335; 370/342; 327/551

(58) Field of Classification Search
USPC ......... 375/229, 230, 232, 233, 234, 316, 343, 375/350; 455/63.1, 67.13, 114.2, 296, 501; 370/335, 342; 327/551
See application file for complete search history.

(56) References Cited

U.S. PATENT DOCUMENTS

| 6,704,059 B2 * | 3/2004 | Kim .............................. 348/614 |
| 7,346,105 B2 * | 3/2008 | Endres et al. ................. 375/233 |
| 2007/0071071 A1 | 3/2007 | Li et al. |
| 2008/0310479 A1 | 12/2008 | Koslar et al. |

OTHER PUBLICATIONS

Bojan Vrcelj et al: "Equalization with Oversampling in Multiuser CDMA Systems" IEEE Transactions on Signal Processing, vol. 53, No. 5, May 2005, pp. 1837-1851.
Li Zhiyuan et al: "Linear Time And Frequency Domain Fractionally Spaced Equalization" IEEE 2007 International Symposium on Microwave, Antenna, Propagation, and EMC Technologies For Wireless Communications, Aug. 2007, pp. 778-781.
Borah D.K. et al: "Sampling and Pefiltering Effects on Blind Equalizer Design" IEEE Transactions on Signal Processing, Jan. 2001, vol. 49, Issue 1, pp. 209-218.
Treichler J. R. et al: "Fractionally Spaced Equilizers" IEEE Signal Processing Magazine, May 1996, vol. 13, No. 3, pp. 65-81.
International Search Report and Written Opinion correlating to PCT/IB2009/055360 dated Aug. 23, 2010.

* cited by examiner

Primary Examiner — Leon Flores

(57) ABSTRACT

A receiver and a method for equalizing signals, the method includes: receiving input signals; sampling the input signals to provide oversampled samples; processing the oversampled samples to provide symbol spaced samples and to provide fractionally spaced samples that represent the oversampled samples; calculating taps of a fractionally spaced equalizer based on the symbol spaced samples; feeding the taps to the fractionally spaced equalizer; and filtering the fractionally spaced samples by the fractionally spaced equalizer to provide equalized samples.

18 Claims, 7 Drawing Sheets

RECEIVER AND METHOD FOR EQUALIZING SIGNALS

FIELD OF THE INVENTION

This invention relates to a receiver and a method for equalizing signals.

BACKGROUND OF THE INVENTION

In modern communication transmitter digital information is converted to analog information and then transmitted over a channel. The digital information can include a sequence of samples that is provided at a symbol rate, i.e. adjacent samples are spaced apart by a symbol period.

In Code Division Multiple Access (CDMA) communication systems, this sequence of samples is referred to as a chip sequence and the rate with which the chips of the chip sequence are is called a chip rate. Thus, adjacent chips are said to be spaced apart by a chip period.

In CDMA communication systems the chip sequence is pulse-shaped by a pulse shaping filter (such as a Root Raised Cosine filter) to provide pulse shaped signals. The pulse shaped signals are transmitted over a medium (such as a multipath fading channel).

The pulse shaping can widen the spectrum of the chip sequence. Noise can be added to the transmitted pulsed shaped signals and timing errors can be introduced to the transmitted pulsed shaped signals.

A receiver can include one or more input antennas for receiving the transmitted pulsed shaped signals. The transmitted pulsed shaped signals (as well as added noise) can be regarded as input signals of the receiver. The input signals are filtered by one or more front end filter of the receiver, sampled to provide input signal samples and then sent to an equalizer.

The equalizer outputs equalized samples that can be further processed by the receiver. The additional processing can include descrambling, de-spreading, decoding and the like.

Linear equalizers based on minimum square error (LMMSE) criterion were recently adopted as baseline equalizers for Code Division Multiple Access (CDMA) based on third generation (3G) communication networks.

There are two families of LMSSE equalizers—fractionally spaced equalizers and symbol spaced equalizers.

In non-CDMA communication systems fractionally spaced equalizers receive oversampled input signal samples—input signal samples that were obtained by sampling the input signals at a sampling rate that is higher than the symbol rate. Adjacent oversampled input samples are spaced apart by a fraction of the symbol period.

In CDMA communication systems fractionally spaced equalizers receive oversampled input signal samples—input signal samples that were obtained by sampling the input signals at a sampling rate that is higher than the chip rate. Adjacent oversampled input samples are spaced apart by a fraction of the chip period.

In CDMA communication systems the taps of fractionally spaced equalizers are spaced apart by a fraction of the chip period of the chip sequence. In non-CDMA communication systems the taps of fractionally spaced equalizers are spaced apart by a fraction of the symbol period. The oversampling fulfills the Nyquist criterion and fractionally spaced equalizers are therefore insensitive to the sampling time at the receiver.

One drawback of fractionally spaced equalizer is their complexity and their high power consumption.

In non-CDMA communication systems symbol spaced equalizers receive symbol rate samples of the received input signal. The taps of symbol spaced equalizers are spaced apart by the symbol period.

In CDMA communication systems symbol spaced equalizers receive chip rate samples of the received input signal. The taps of chip spaced equalizers are spaced apart by the chip period.

Due to the pulse shaping applied by the transmitter the sampling does not fulfill the Nyquist criterion and symbol spaced equalizers are sensitive to the sampling time at the receiver.

In contrary to fractionally spaced equalizers, symbol spaced equalizers are simple and their power consumption is relatively low.

SUMMARY OF THE INVENTION

The present invention provides a method and a receiver as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
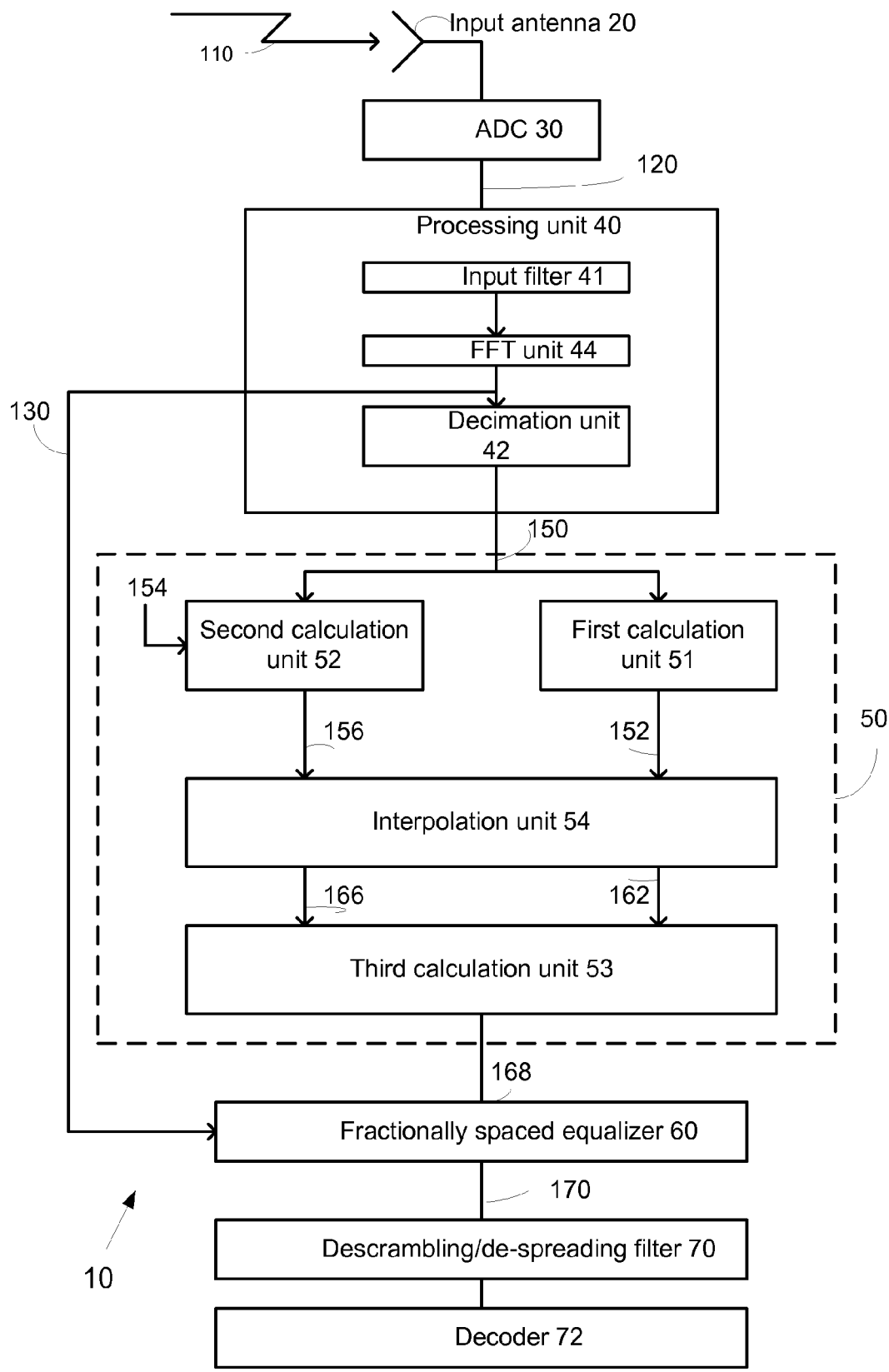
FIG. 1 schematically shows a block diagram of an example of an embodiment of a receiver.

In the following specification, the invention will be explained with reference to specific examples of embodiments of the invention. It will, however, be evident that various modifications and changes can be made therein without departing from the broader spirit and scope of the invention as set in the appended claims.

Because the described examples may, for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

At least some of the stages of the method illustrated below and at least some units or components of the receiver illustrated below can also be implemented in a computer program for running on a computer system. At least some of the stages of the method illustrated below can be executed by executing code portions when run on a programmable apparatus, such as a computer system or enabling a programmable apparatus to perform functions of a receiver according to the invention. For example, various filters, time domain to frequency domain converters, processing stages executed by the processing unit, and calculation performed by the calculator of the receiver can be implemented by software.

A computer program is a list of instructions such as a particular application program and/or an operating system. The computer program can for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program can be stored internally on computer readable storage medium or transmitted to the computer system via a computer readable transmission medium. All or some of the computer program can be provided on computer readable media permanently, removably or remotely coupled to an information processing system. The computer readable media can include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system can for instance include at least one processing unit, associated memory and a number of input/output (I/O) devices. When executing the computer program, the computer system processes information according to the computer program and produces resultant output information via I/O devices.

In the following specification, the invention has been described with reference to specific examples of embodiments of the invention. It will, however, be evident that various modifications and changes can be made therein without departing from the broader spirit and scope of the invention as set forth in the appended claims.

A method and a receiver for equalizing signals are provided. The method and the receiver utilize an equalization algorithm that has a performance comparable to fractionally spaced equalization and complexity comparable to symbol spaced equalization.

The equalization algorithm includes: (a) sampling input signals to provide oversampled samples; (b) processing the oversampled samples to provide symbol spaced symbols and fractionally spaced samples; (c) calculating taps of a fractionally spaced equalizer based on the symbol spaced samples; (d) feeding the taps to the fractionally spaced equalizer, and (e) filtering the fractionally spaced samples by the fractionally spaced equalizer to provide equalized signals.

The method and receiver benefit from performing calculation in the frequency domain, by interpolating autocorrelation results and cross-correlation results (instead of interpolating the oversampled samples), by applying anti-aliasing filtering and by ignoring some of the cross-correlation results due to redundancies introduced by the anti-aliasing filtering.

The interpolation of the autocorrelation results and cross-correlation results reduces the complexity of the equalization algorithm, as can be illustrated by the following example: the oversampled samples can include 1280 samples while the auto-correlation results can include 189 elements. The low number of auto-correlation elements can be partially contributed to the anti-aliasing that facilitates ignoring various elements of the auto-correlation. Interpolating the 189 elements is more efficient than interpolating the 1280 fractionally spaced samples.

The following description refers to non-CDMA communication systems such as but not limited to Time Division Multiplex Access (TDMA) communication systems. However, the following description can be applied to CDMA communication systems as well. The terms "symbol" as used in relation to a non-CDMA communication system is within the context of CDMA referred to as "chip" and accordingly when applying the present specification to CDMA systems, instead of the term "symbol" the term "chip" should be read. For example, the term "symbol spaced samples" should be replaced by "chip spaced samples".

In a CDMA communication system the term "fractionally spaced" refers to a fraction of a chip period. For example, a fractionally spaced equalizer is an equalizer that is defined by taps that are spaced apart from each other by a fraction of a chip period. Yet for another example, fractionally spaced samples are samples that are spaced apart by a fraction of a chip period.

FIG. 1 schematically shows a block diagram of an example of an embodiment of a receiver 10. The receiver 10 includes an input antenna 20, a sampling unit such as an analog to digital converter (ADC) 30, a processing unit 40, a calculator 50, a fractionally spaced equalizer 60 and additional components such as a descrambling/de-spreading filter 70 and a decoder 72.

The input antenna 20 is connected to the ADC 30. The ADC 30 is connected to the processing unit 40. The processing unit 40 is also connected to the calculator 50 and to the fractionally spaced equalizer 60. The fractionally spaced equalizer 60 is connected to the descrambling/de-spreading filter 70. The descrambling/de-spreading filter 70 is connected to the decoder 72.

The input antenna 20 receives an input signal 110 and sends it to the ADC 30. The ADC 30 samples the input signal 110 with an oversampling ratio V to provide oversampled samples 120. The oversampled samples 120 are spaced apart from each other by a fraction of a sample period.

The oversampled samples 120 represent multiple (L) diversity branches. The number (L) of diversity branches equals the oversampling ratio (V) multiplied by the number (S) of input antennas (such as the input antenna 20) that receive the input signal. In mathematical terms $L=V*S$.

The diversity branches are processed by the receiver 10 in order to determine the content of the chip sequence that was pulsed shaped, transmitted over a channel and received by the receiver 10.

The oversampled samples 120 are sent from the ADC 30 to the processing unit 40. The processing unit 40 processes the oversampled samples 120 to provide the fractionally spaced samples 130 and to provide the symbol spaced samples 150. The symbol spaced samples 150 are sent from the processing unit 40 to the calculator 50. The fractionally spaced samples 130 are sent to the fractionally spaced equalizer 60.

The fractionally spaced samples 130 are spaced apart by a fraction of the symbol period. The sample spaced samples 150 are spaced apart by a sample period.

The symbol spaced samples 150 and the fractionally spaced samples 130 represent the oversampled samples 120—as the symbol spaced samples 150 and the fractionally spaced samples 130 convey information that represents at least a portion of the content of the oversampled samples 120.

Each of the symbol spaced samples 150 and the fractionally spaced samples 130 can represent one or multiple diversity branches.

The processing unit 40 of FIG. 1 does not include an anti-aliasing filter—it generates the fractionally spaced samples 130 without performing anti-aliasing filtering.

The processing unit 40 can, for example, apply a matched filtering process, perform a time domain to frequency domain conversion (such as Fast Fourier Transform), perform a down-conversion, and the like.

The processing unit 40 includes an input filter 41, a time domain to frequency domain converter such as a Fast Fourier Transform (FFT) unit 44 and a decimation unit 42 that are serially connected to each other. The FFT unit 44 is connected between the input filter 41 and the decimation unit 42.

The input filter 41 can, for example, be a matched filter, a selectivity filter, and the like. The input filter outputs filtered samples to the FFT unit 44. The FFT unit 44 applies a time domain to frequency domain conversion on the filtered samples to provide the fractionally spaced samples 130.

The decimation unit 42 decimates (down-samples) the fractionally spaced samples 130 to provide the symbol spaced samples 150. The calculator 50 receives the symbol spaced samples 150 and calculates taps (denoted 168) of the fractionally spaced equalizer 60 based on the symbol spaced samples 150. The calculator 50 also feed the taps 168 to the fractionally spaced equalizer 60.

The calculator 50 includes a first calculation unit 51, a second calculation unit 52, an interpolation unit 54 and a third calculation unit 53.

The first calculation unit 51 receives the symbol spaced samples 150 and calculates a symbol spaced autocorrelation 152 of the symbol spaced samples 150. This can involve performing autocorrelation of diversity branches and performing cross correlation of different diversity branches.

The second calculation unit 52 receives the symbol spaced samples 150 and a pilot sequence 154. The second calculation unit 52 calculates a symbol spaced channel estimation 156 by performing a cross correlation between the symbol spaced samples 150 and the pilot sequence 154.

The interpolation unit 54 receives the symbol spaced autocorrelation 152 and interpolates it to provide a fractionally spaced autocorrelation 162. The interpolation unit 54 also receives the symbol spaced channel estimation 156 and interpolates it to provide a fractionally spaced channel estimation 166.

The interpolation unit 54 can perform an interpolation by applying an interpolation filter that can be represented by a vector w. Vector w can be defined as a truncated sinc series.

The n'th element (w(n)) of the vector w can be mathematically represented by the following equation: $w(n)=[\mathrm{Sinus}((n+0.5)*T)]/((n+0.5)*T)=\mathrm{Sinc}((n+0.5)*T)$. The variable T is the sample period of the input signal 110 or of the chip sequence.

Alternatively, the interpolation unit 54 can perform the interpolation using any other interpolation method.

The third calculation unit 53 receives the fractionally spaced autocorrelation 162 and the fractionally spaced channel estimation 166. The third calculation unit 53 calculates the taps 168 of the fractionally spaced equalizer 60 based on the fractionally spaced autocorrelation 162 and the fractionally spaced channel estimation 166.

The third calculation unit 53 can perform at least one of the following operations or a combination thereof: averaging, circulant extension, FFT, matrix inversion, multiplication, inverse FFT (IFFT). Some of these operations will be illustrated in greater details in relation to FIG. 3.

The third calculation unit 53 outputs (feeds) the taps 168 of the fractionally spaced equalizer 60 or values that can be FFT converted or IFFT converted to provide the taps.

The fractionally spaced equalizer 60 performs a fractional spaced equalization by performing a sequence of multiplication and addition operations. The fractionally spaced equalizer 60 performs the equalization after its taps are set to values that are based on the taps 168 that are calculated by the third calculation unit 53.

The fractionally spaced equalizer 60 outputs equalized signals 170 that can be further processed by the receiver 10. For example, the equalized signals 170 can be filtered by the descrambling/de-spreading unit 70, decoded by the decoder 72, and the like.

Figure 2:
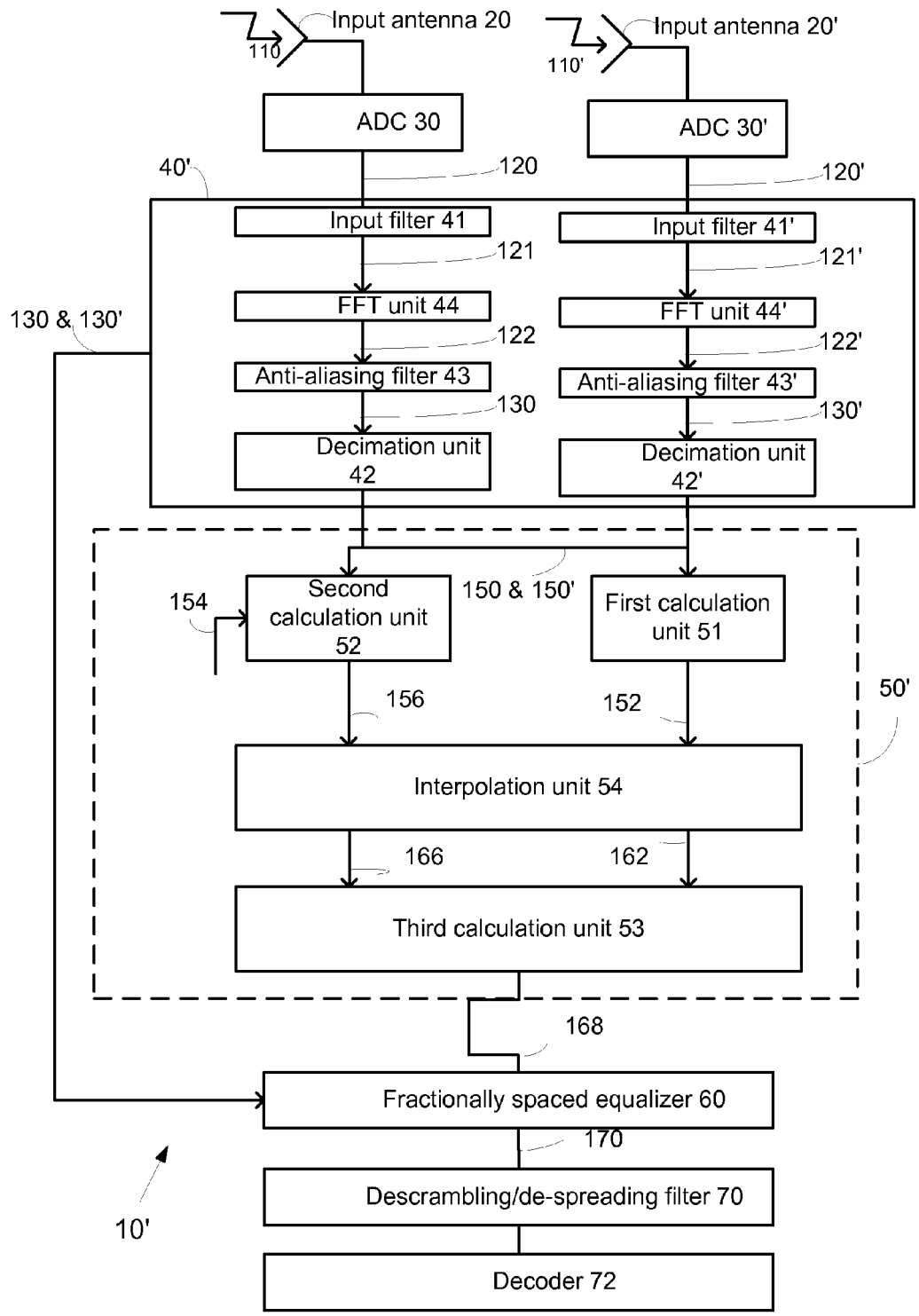
FIG. 2 schematically shows a block diagram of an example of an embodiment of a receiver.

FIG. 2 schematically shows a block diagram of an example of an embodiment of a receiver 10'. The receiver 10' includes input antennas 20 and 20', an ADC 30, an ADC 30', a processing unit 40', a calculator 50, a fractionally spaced equalizer 60 and additional components such as a descrambling/de-spreading unit 70 and a decoder 72.

The receiver 10' of FIG. 2 differs from the receiver 10 of FIG. 1 by the following: (i) receiver 10' includes a pair of input antennas 20 and 20' (instead of a single input antenna 20), (ii) receiver 10' includes a pair of ADCs 30 and 30' (instead of a single ADC 30), and (iii) receiver 10' includes anti-aliasing filters 43 and 43'. The anti-aliasing filters 43 and 43' belong to the processing unit 40'.

The input antenna 20 is connected to the ADC 30 and the input antenna 20' is connected to the ADC 30'.

The input antenna 20 receives the input signal 110. The ADC 30 generates the oversampled samples 120. The input antenna 20' receives the input signal 110'. The ADC 30' generates the oversampled samples 120'.

The oversampled samples 120 represent a plurality (V) of diversity branches. The oversampled samples 120' represent another plurality (V) of diversity branches. If V=2, receiver 10' processes four diversity branches.

The oversampled samples 120 and the oversampled samples 120' are sent to the processing unit 40'.

The processing unit 40' processes the oversampled samples 120 and 120' to provide the fractionally spaced samples 130, the fractionally spaced samples 130', the symbol spaced samples 150 and the symbol spaced samples 150'.

The processing unit 40' includes: (i) input filters 41 and 41', (ii) anti-aliasing filters 43 and 43', (iii) decimation units 42 and 42', and (iv) FFT units 44 and 44'. The processing unit 40' processes, when operational, the oversampled samples 120 and 120' by at least one of the following operations: applying a matched filter, performing a time domain to frequency domain conversion (such as Fast Fourier Transform), anti-aliasing filtering, down-conversion, and the like.

The anti-aliasing filter 43 is connected between the FFT unit 44 and the decimation unit 42. The anti-aliasing filter 43' is connected between the FFT unit 44' and the decimation unit 42'.

Each of the input filters 41 and 41' can, for example, be a matched filter, a selectivity filter, and the like.

The input filters 41 and 41' filter the oversampled samples 120 and 120' to provide filtered fractionally spaced samples 121 and 121'.

The FFT units 44 and 44' perform a time to frequency domain conversion on the filtered fractionally spaced samples 121 and 121' to provide intermediate fractionally spaced samples 122 and 122'.

The anti-aliasing filters 43 and 43' perform anti-aliasing filtering of the intermediate fractionally spaced samples 122 and 122' to provide fractionally spaced samples 130 and 130'.

Each anti-aliasing filter out of 43 and 43' can have a time response that is substantially equal to the symbol period of the chip sequence or of the input signals 110 or 110'. Each anti-aliasing filter out of 43 and 43' can be, for example, a simple truncated "sinc" filter based on that symbol period.

The ADC 30 and the anti-aliasing filter 43 can be integrated together. Also the ADC 30' and the anti-aliasing filter 43' can be integrated together The decimation units 42 and 42' decimate (down-sample) the fractionally spaced samples 130 and 130' to provide symbol spaced samples 150 and 150'.

The symbol spaced samples 150 and 150' are sent from the processing unit 40' to the calculator 50. The fractionally spaced samples 130 and 130' are sent to the fractionally spaced equalizer 60.

The symbol spaced samples 150 and the fractionally spaced samples 130 represent the oversampled samples 120, whilst the symbol spaced samples 150' and the fractionally spaced samples 130' represent the oversampled samples 120'.

The calculator 50 receives the symbol spaced samples 150 and 150' and calculates the taps of the fractionally spaced equalizer 60 based on the symbol spaced samples 150 and 150'.

The First calculation unit 51 receives the symbol spaced samples 150 and 150', and calculates a symbol spaced autocorrelation 152 of the symbol spaced samples 150 and 150'. The calculation can involve, for example, performing autocorrelation of diversity branches and performing cross correlation of different diversity branches.

The second calculation unit 52 receives the symbol spaced samples 150 and 150' and a pilot sequence 154. The second calculation unit calculates a symbol spaced channel estimation 156 by performing a cross correlation between each of symbol spaced samples 150 and 150' and between the pilot sequence 154. The pilot sequence 154 can be provided for each diversity branch. The pilot sequence 154 can be FFT converted by an FFT that is not shown in either of the figures.

The interpolation unit 54 receives the symbol spaced autocorrelation 152 and interpolates it to provide the fractionally spaced autocorrelation 162. The interpolation unit 54 also receives the symbol spaced channel estimation 156 and interpolates it to provide the fractionally spaced channel estimation 166.

The third calculation unit 53 receives the fractionally spaced autocorrelation 162 and the fractionally spaced channel estimation 166 and calculates the taps 168 of the fractionally spaced equalizer 60 based on the fractionally spaced autocorrelation 162 and the fractionally spaced channel estimation 166.

The third calculation unit 53 can perform at least one of the following operations or a combination thereof: averaging, circulant extension, FFT, matrix inversion, multiplication, IFFT and the like.

The fractionally spaced equalizer 60 performs fractional spaced equalization by performing a sequence of multiplication and addition operations. The fractionally spaced equalizer 60 performs the equalization after its taps are set to values that are based on (or equal to) taps 168 that were calculated by the third calculation unit 53.

The fractionally spaced equalizer 60 outputs equalized signals 170.

Figure 3:
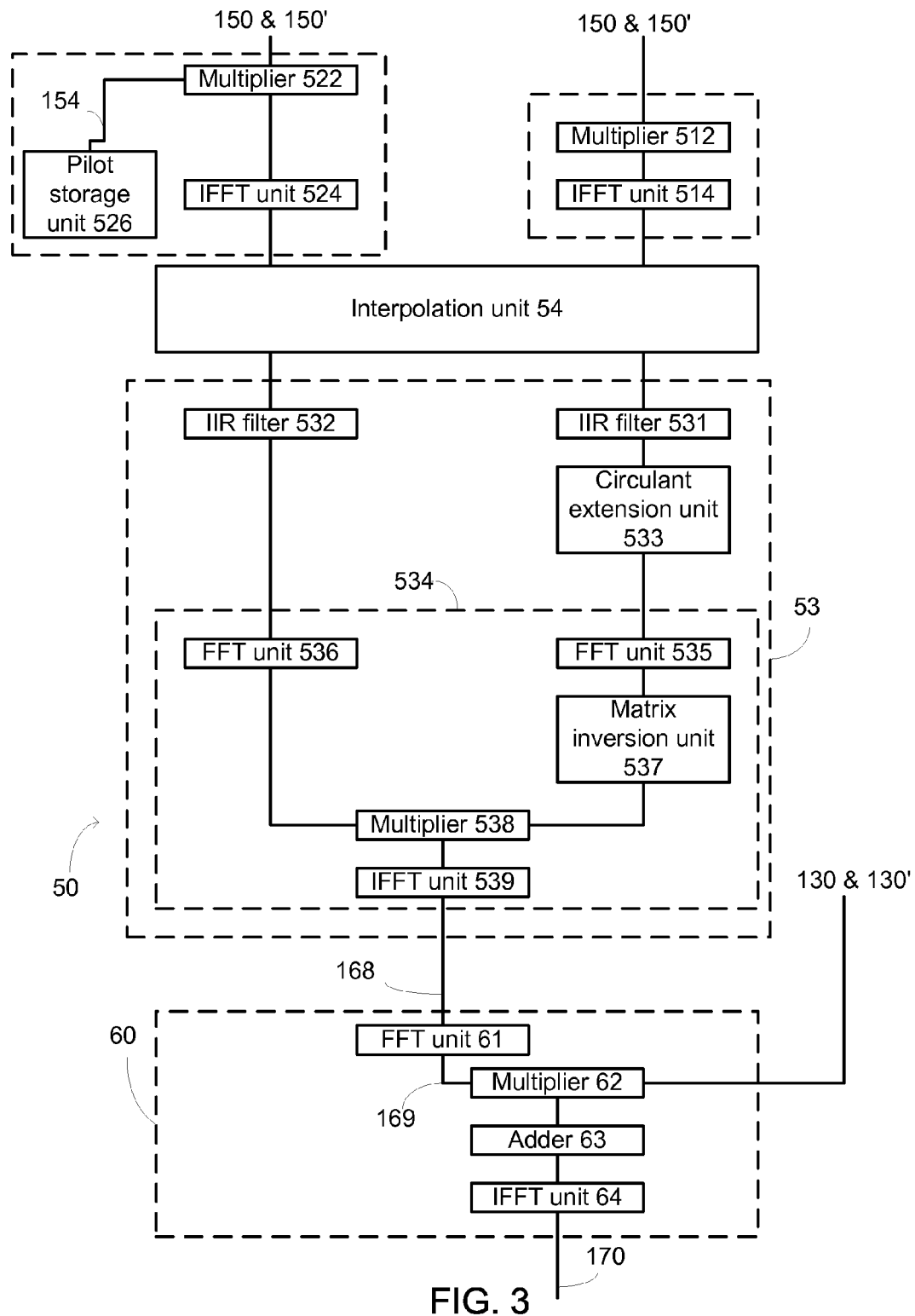
FIG. 3 schematically shows a block diagram of an example of an embodiment of calculator and of a fractionally spaced equalizer.

FIG. 3 schematically shows an example of a calculator 50 and of a fractionally spaced equalizer 60.

The calculator 50 performs various calculations such as matrix transforms, FFT, IFFT as well as additional mathematical operations that simplify the equalizing process and especially simplify the calculation of taps of the fractionally spaced filter 60.

The fractionally spaced filter 60 can, for example, be a half symbol spaced filter although other fractionally spaced filters (⅓, ¼, ⅛, and the like) can be included in the receiver 10 or 10'.

The manner in which the calculator 50 and the fractionally spaced equalizer 60 operate will be illustrated by using the following notations:

bold face letters represent vectors.

capital letters represent matrices.

$v''$ is the flipped and conjugated version of a vector v.

$v^T$ is the transposed version of the vector v.

$M^T$ is the transposed version of a matrix M.

$M^{-1}$ is the inverse matrix of M.

diag(a) is a diagonal matrix with a in its main diagonal.

$F_{nm}$ is a Fourier transform matrix with dimensions of n×m.

x is a vector that its elements are the symbol spaced samples 150.

$x_i$ is a vector that its elements belong to the i'th diversity branch of the symbol spaced samples 150.

p is a vector that its elements form a pilot sequence.

g is a cross-correlation vector between p and $x^H$ ($g=x^H*p$).

R is a covariance matrix that represents symbol spaced autocorrelation 160. $R=E(x*x^H)$.

f is a vector that its elements are the taps of fractionally spaced filter 60. It can be calculated by using the following linear minimum mean square error (LMMSE) criterion: $f=R^{-1}*g$.

w is an interpolation filter vector that represents the interpolation unit 53, wherein $w_n=\text{Sinc}((n+1/S)*T)$.

$\Theta$ represents a convolution operation.

The first calculation unit 51 includes a multiplier 512 that is followed by the IFFT unit 514.

The First calculation unit 51 receives symbol spaced samples 150 and 150' and calculates a symbol spaced autocorrelation 152 that is represented by the covariance matrix R.

The multiplier 512 receives vectors that represent the symbol spaced samples 150 and 150', multiplies corresponding elements of these vectors to provide a symbol spaced autocorrelation vector 152.

R can be a block Topelitz matrix where its Ri,j Topelitz block is the covariance built from a cross-correlation vector $r_{i,j}$, wherein $r_{i,j}=F^H_{D,N}*\text{diag}(F_{N,N}x_i)*F_{N,N}x_i''$. The cross-correlation vector $r_{i,j}$ can be calculated by performing a circular convolution between $x_i$ and $x_i''$: $r_{i,j}=F^H_{D,N}*\text{diag}(F_{N,N}x_i)*(F_{N,N}x_j)^*$.

If there are four diversity branches (B0, B1, B2 and B3) then R should include 16 blocks (matrixes) that represent 16 different correlations between these diversity branches. The indecies of each of the blocks (matrixes) that form R indicate the diversity branches that are correlated to form these matrixes.

R can have the following format:

$$R = \begin{pmatrix} R_{0,0} & R_{0,1} & R_{0,2} & R_{0,3} \\ R_{1,0} & R_{1,1} & R_{1,2} & R_{1,3} \\ R_{2,0} & R_{2,1} & R_{2,2} & R_{2,3} \\ R_{3,0} & R_{3,1} & R_{3,2} & R_{3,3} \end{pmatrix}$$

Because R is a block Topelitz matrix then $R_{i,j}=R_{j,i}^H$. When R includes 4×4 blocks (matrices) then there is no need to calculate the entire sixteen matrices—only 10 can be calculated.

Because of the anti-aliasing filtering, some of these matrices are redundant—or can be ignored without significant loss of performance. Thus, the First calculation unit 51 can calculate only matrices $R_{0,0}$, $R_{0,2}$ and $R_{2,2}$.

If the delay spread of the input signals is less that 32 chips, then each matrix out of $R_{0,0}$, $R_{0,2}$ and $R_{2,2}$ should include 32 columns and 32 rows.

Because each of $R_{0,0}$, $R_{0,2}$ and $R_{2,2}$ is a Topelitz matrix (a matrix in which each descending diagonal from left to right is constant) then each matrix can be represented by a vector of 63 elements—as the number of descending diagonals in the matrix.

A small constant can be added to the diagonal of R (by the first calculation unit 51) in order to improve its numerical stability.

The second calculation unit 52 includes a multiplier 522 that is followed by an IFFT unit 524 and a pilot storage unit 526. The pilot storage unit 526 stores a pilot sequence 154. The multiplier 522 can be preceded by an FFT unit that performs an FFT conversion on a pilot sequence.

The second calculation unit 52 calculates the symbol spaced channel estimation 156. The symbol spaced channel estimation 156 is represented by vector g.

$$g=[g_1^T \ldots g_L^T], \text{wherein: } g_j=F^H_{D,N}*\text{diag}(F_{N,N}p)^*(F_{N,N}x_j)^*.$$

The interpolation unit 54 receives the symbol spaced autocorrelation 152 and interpolates it to provide the fractionally spaced autocorrelation 162.

Assuming that $r_{ij}$ is provided by the first calculation unit 51 then $r_{2k,2l+1}$ is interpolated by: $r_{2k,2l+1}=r_{ij}*w$ and $r_{2k+1,2l+1}$ is interpolated by: $r_{2k+1,2l+1}=r_{ij}*w'$.

The interpolation unit 54 also receives the symbol spaced channel estimation 156 and interpolates it to provide the fractionally spaced channel estimation 166. Assuming that $g_{2k}$ is provided by the second calculation unit 52, then $g_{2k+1}$ is interpolated by: $g_{2k+1}=g_{2k}*w$.

The third calculation unit 53 includes: (i) averaging units such as Infinite Impulse Response (IIR) filters 531 and 532, (ii) a circulant extension unit 533, and (iii) a normal equation solver 534.

The circulant extension unit 533 is connected between the IIR filter 531 and the normal equation solver 534 and is arranged to process R.

The IIR filter 532 is connected between the interpolation unit 54 and the normal equation solver 534 and is arranged to filter g.

The IIR filter 531 averages R. The averaging can be applied on R results obtained from consecutive blocks of symbol spaced samples. The taps 168 of the fractionally spaced equalizer 60 are calculated per each block of symbol spaced symbols so that the averaging can take into account results from the previous calculation of such taps.

The IIR filter 532 averages vector g. The averaging can be applied on g results obtained from the consecutive blocks of the symbol spaces samples.

In order to diagonalize the autocorrelation matrix using FFT, the averaged R matrix should be a block circulant. The circulant extension unit 533 can achieve this goal by replacing each of (the averaged) block Rij by its circular approximation Cij. It is noted that the receiver 10' can also include an extending unit (not shown) for extending g to provide q, $q=[g^T*o^T_{DL}]^T$. O is the zero matrix.

The normal equation solver 534 outputs the taps 168 of the fractionally spaced equalizer 60. The process applied by the normal equation solver 534 starts by diagonalizing each sub-block Cij in C by calculating the following: $\Lambda_{ij}=F_{2D,2D}*C_{i,j}*F^H_{2D,2D}$. It is noted that C can equal $(I_L \Theta F^H_{2D,2D})*\Lambda*(I_L \Theta F_{2D,D})$. In this case f can equal $(I_L \Theta F^H_{2D,2D})*\Lambda^{-1}*(I_L \Theta *F_{2D,D})*q$. $I_L$ is an m×m identity matrix.

These diagonalizing operations of the normal equation solver 534 are executed by the FFT unit 535, the FFT unit 536, the matrix inversion unit 537, the multiplier 538 and the IFFT unit 539.

The FFT unit 535 is connected between the circular extension unit 533 and the matrix inversion unit 537. The FFT unit 536 is connected between the IIR filter 532 and the multiplier 538. The Multiplexer 538 is also connected to the IFFT unit 539 and to the circular extension unit 533. The IFFT unit 539 is connected to the fractionally spaced filter 60.

The fractionally spaced equalizer 60 receives the taps 168 and performs an FFT transform (by a FFT unit 61) to provide frequency domain taps 169. The frequency domain taps 169 are multiplied (by the multiplier 62) by the fractionally spaced samples 130 and 130' to provide products that are sent to the adder 63. The adder 63 adds each product to previous sums. The output of the adder 63 is connected to the IFFT unit 64 that outputs the equalized signals 170.

$$\begin{cases} x_1^{2X}(m), m=0, 1, \ldots, 2N+1 \\ x_2^{2X}(m), m=0, 1, \ldots, 2N+1 \end{cases}$$

The input signals 110 and 110' can be represented by the following equations:

$$\begin{cases} x_1(n) = x_1^{2X}(2n), n=0, 1, \ldots, N \\ x_2(n) = x_1^{2X}(2n+1), n=0, 1, \ldots, N \\ x_3(n) = x_2^{2X}(2n), n=0, 1, \ldots, N \\ x_4(n) = x_2^{2X}(2n+1), n=0, 1, \ldots, N \end{cases}$$

After an oversampling with an oversampling ratio of two the following diversity branches are provided:

$$R_k = \begin{bmatrix} r_{11}(k) & r_{12}(k) & r_{13}(k) & r_{14}(k) \\ r_{21}(k) & r_{22}(k) & r_{23}(k) & r_{24}(k) \\ r_{31}(k) & r_{32}(k) & r_{33}(k) & r_{34}(k) \\ r_{41}(k) & r_{42}(k) & r_{43}(k) & r_{44}(k) \end{bmatrix}$$

The auto-correlation and cross-correlation can be expressed by the following equations:

$$R_k = \begin{bmatrix} r_{11}(k) & \frac{1}{2}[r_{11}(k)+r_{11}(k+1)] & r_{13}(k) & \frac{1}{2}[r_{13}(k)+r_{13}(k+1)] \\ \frac{1}{2}[r_{11}(k)+r_{11}(k-1)] & r_{11}(k) & \frac{1}{2}[r_{13}(k)+r_{13}(k-1)] & r_{13}(k) \\ r_{31}(k) & \frac{1}{2}[r_{31}(k)+r_{31}(k+1)] & r_{33}(k) & \frac{1}{2}[r_{33}(k)+r_{33}(k+1)] \\ \frac{1}{2}[r_{31}(k)+r_{31}(k-1)] & r_{31}(k) & \frac{1}{2}[r_{33}(k)+r_{33}(k-1)] & r_{33}(k) \end{bmatrix}$$

Wherein $$\begin{cases} r_{11}(k) = \sum_n x_1(n)x_1^*(n+k) \\ r_{13}(k) = \sum_n x_1(n)x_3^*(n+k) = r_{31}^*(-k) \\ r_{33}(k) = \sum_n x_3(n)x_3^*(n+k) \end{cases}$$

Figure 4:
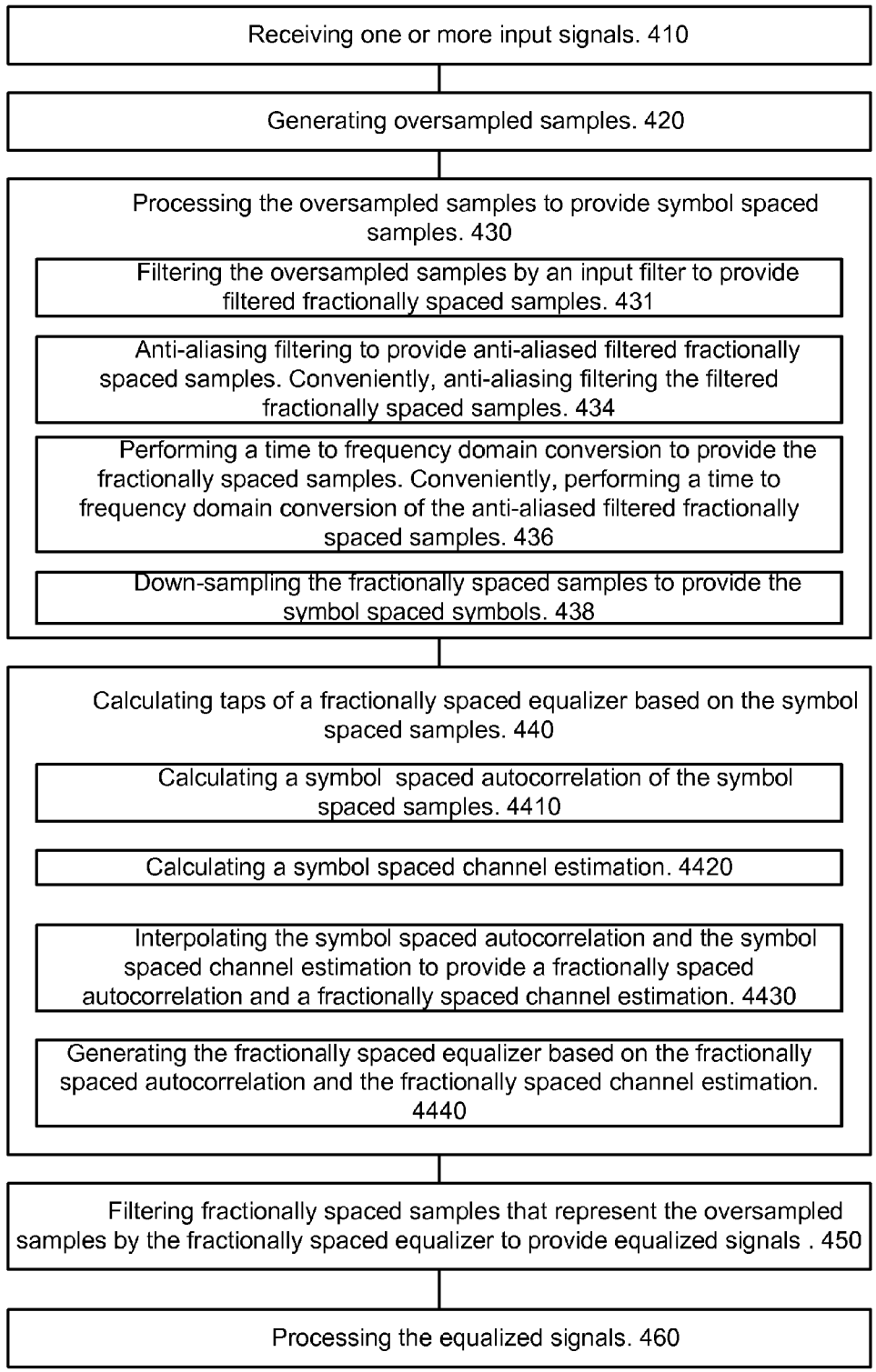
FIG. 4 schematically shows a flow-chart of an example of a method for equalizing signals.

FIG. 4 schematically shows a flow-chart of an example of a method 400 for equalizing signals.

The illustrated method 400 includes stages 410, 420, 430, 440, 450 and 460 and may for example be performed with the receiver of FIG. 1 or 2.

Stage 410 includes receiving one or more input signals. An input signal can include a sequence of electromagnetic pulses or waveforms that are received by an input antenna. An input antenna is an antenna that receives electromagnetic radiation.

Stage 410 can, for example, be executed by a radio frequency (RF) front-end of a receiver. The receiver can be included in a cell phone, media player, computer and the like.

Stage 410 can, for example, include receiving input signals from multiple input antennas. The multiple antennas can receive (substantially simultaneously) the same (or substantially the same) transmitted electromagnetic pulses or waveforms.

Stage 420 includes generating oversampled samples. These oversampled samples reflect the received one or more input signals. They can be generated by oversampling the one or more input signals, filtering the samples by an input filter and the like.

Stage 430 includes processing the oversampled samples to provide symbol spaced samples.

Stage 430 can, for example, include at least one of the following stages or a combination thereof: (i) stage 431 of filtering the oversampled samples by an input filter (such as a matched filter or a selectivity filter) to provide filtered fractionally spaced samples, (ii) stage 434 of anti-aliasing filtering of the filtered fractionally spaced samples to provide anti-aliased filtered fractionally spaced samples, (iii) stage 436 of performing a time to frequency domain conversion on the anti-aliased filtered fractionally spaced samples to provide the fractionally spaced samples; and (iv) stage 438 of down-sampling the fractionally spaced samples to provide the symbol spaced symbols.

Stage 434 can include anti-aliasing filtering of the oversampled samples to provide the fractionally spaced samples that represent the oversampled samples. Stage 434 can include applying an anti-aliasing filter that has a time response that is substantially equal to a symbol period of the one or more input signal.

It is noted that stage 420 can include generating the oversampled samples by an analog to digital converter and stage 434 can include performing the anti-aliasing filtering by an anti-aliasing filter that is integrated with the analog to digital filter.

Stage 440 includes calculating taps of a fractionally spaced equalizer based on the symbol spaced samples.

Stage 440 can include at least one of the following stages or a combination thereof: (i) stage 4410 of calculating a chip spaced autocorrelation of the symbol spaced samples; (ii) stage 4420 of calculating a symbol spaced channel estimation; (iii) stage 4430 of interpolating the symbol spaced autocorrelation and the symbol spaced channel estimation to provide a fractionally spaced autocorrelation and a fractionally spaced channel estimation; and (iv) stage 4440 of generating the fractionally spaced equalizer based on the fractionally spaced autocorrelation and the fractionally spaced channel estimation.

Stage 445 includes feeding the taps to the fractionally spaced filter.

Stage 450 includes filtering fractionally spaced samples that represent the oversampled samples by the fractionally spaced equalizer to provide equalized signals. The filtering is executed by a fractionally spaced filter that was fed with taps that were calculated during stage 440. Stage 440 can, for example, include calculating a fractionally spaced equalizer that is a half symbol spaced equalizer.

Stage 460 includes processing the equalized samples. This stage can include filtering, decoding, displaying images based on the samples, playing music based on the samples and the like.

Figure 5:
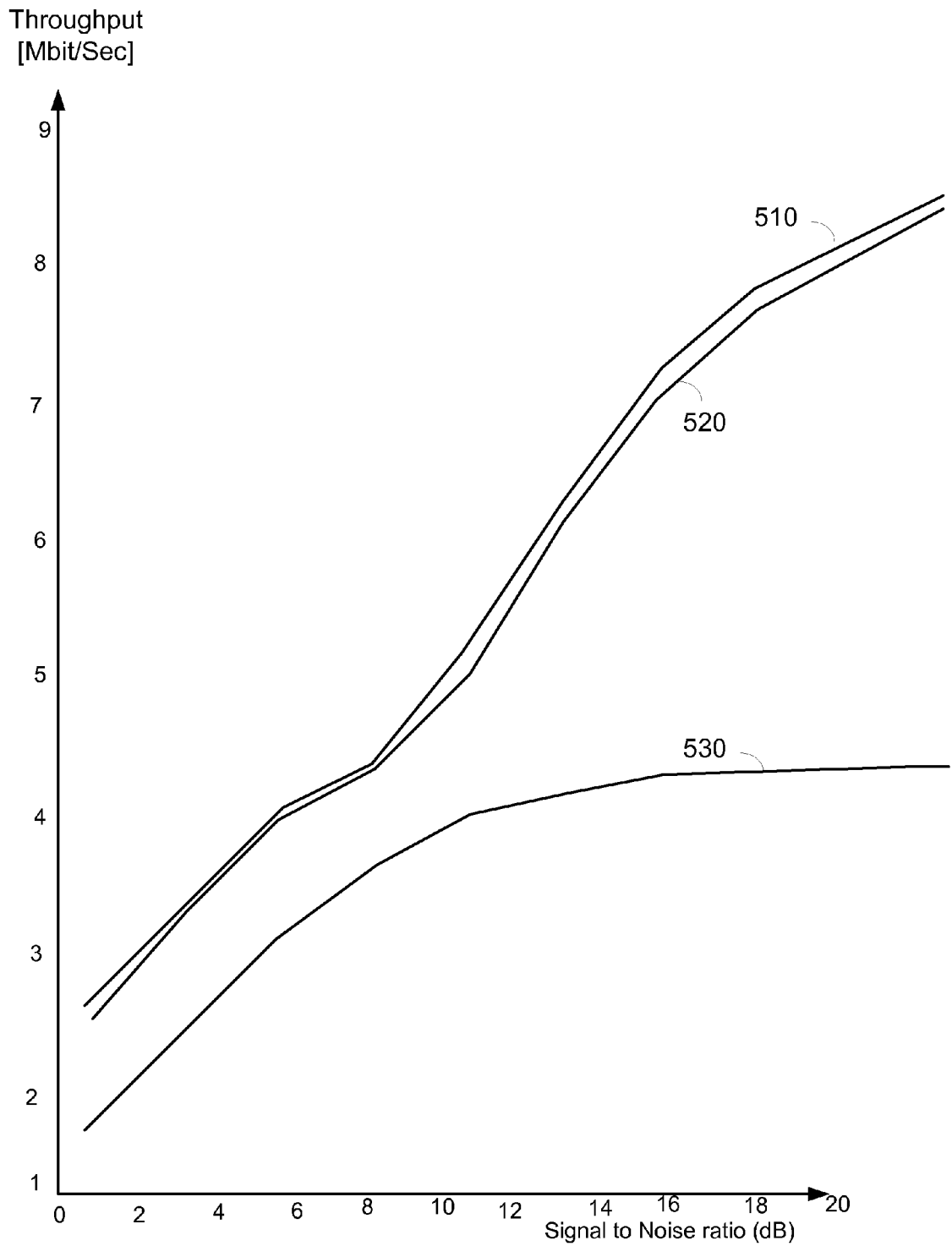
FIG. 5 schematically shows graphs that illustrate an example of results of a simulation that evaluated different equalization algorithms.
Figure 6:
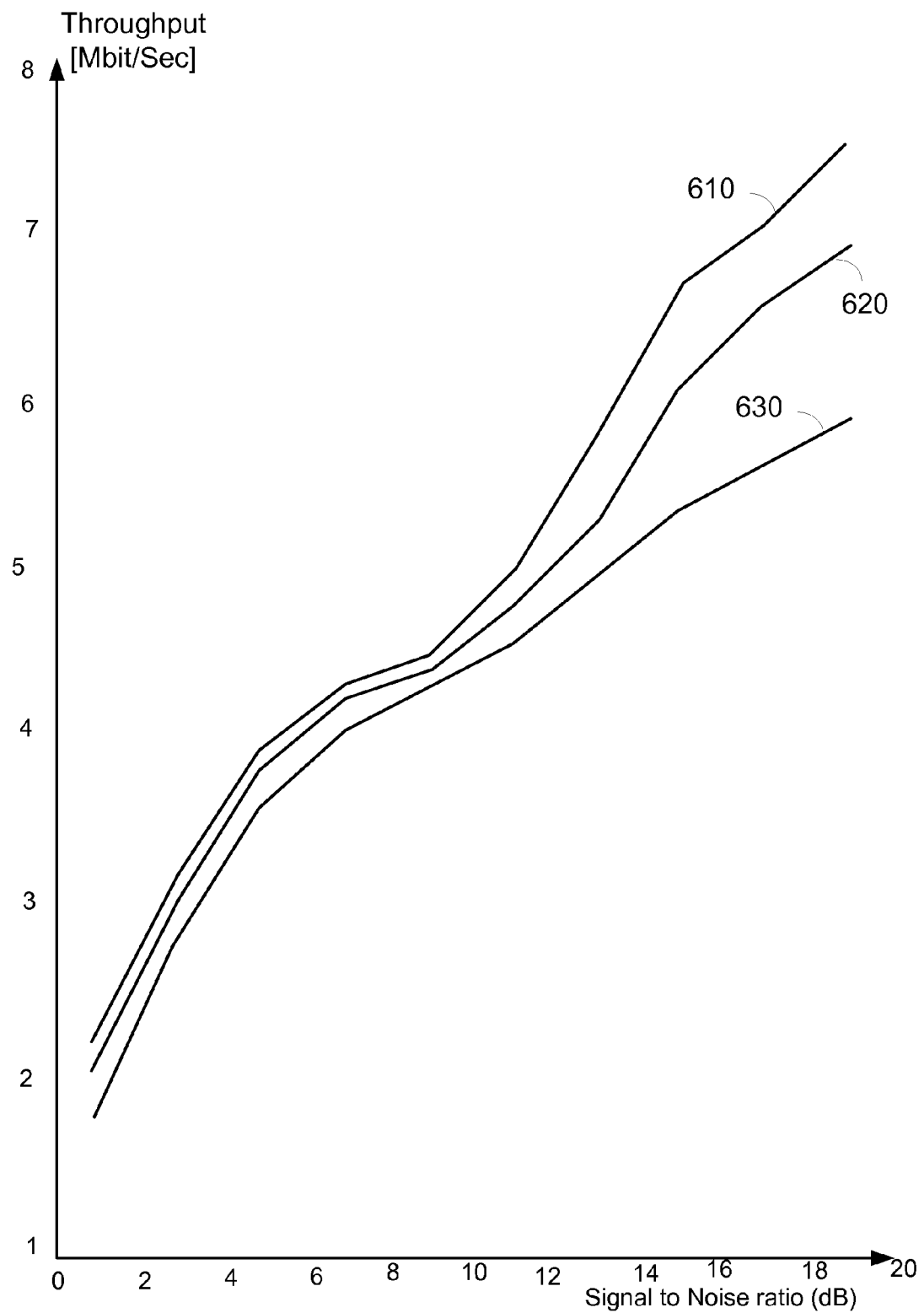
FIG. 6 schematically shows graphs that illustrate an example of results of another simulation that evaluated different equalization algorithms.
Figure 7:
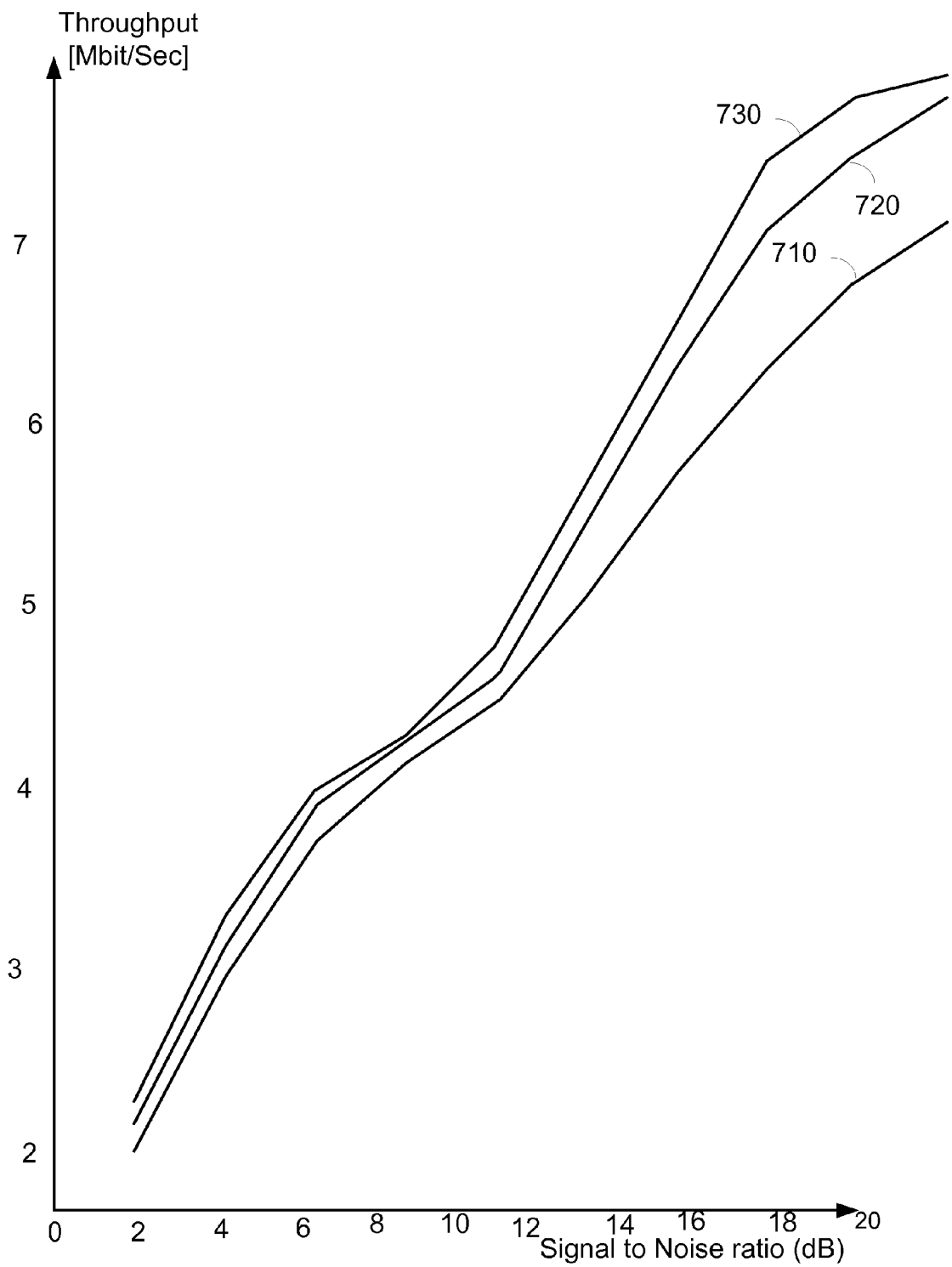
FIG. 7 schematically shows graphs that illustrate an example of results of a further simulation that evaluated different equalization algorithms.

FIGS. 5, 6 and 7 schematically show examples of graphs that illustrate the results of simulations that evaluated different equalization algorithms.

FIG. 5 illustrates the signal to noise ratio (SNR) versus throughput for a fractionally spaced equalizer (graph 510), a symbol spaced equalizer (graph 530) and an improved equalizer (graph 520) such as the equalizer of FIG. 2 for a flat channel profile.

It can be easily seen that the performance of the improved equalizer was substantially the same as the fractionally spaced equalizer and that the performance of the symbol spaced equalizer were lower in relation to the performance of the other equalizers.

FIG. 6 illustrates the signal to noise ratio (SNR) versus throughput for a fractionally spaced equalizer, a symbol spaced equalizer and an improved equalizer for a pedestrian B channel profile.

It can be easily seen that the performance of the improved equalizer (graph 610), was better than the performance of the symbol spaced equalizer (graph 630), and was slightly lower than the performance of the fractionally spaced equalizer (graph 620).

FIG. 7 illustrates the SNR versus throughput for a fractionally spaced equalizer, a symbol spaced equalizer and an improved equalizer for a vehicle A channel profile.

It can be easily seen the performance of the improved equalizer (graph 710), was better than the performance of the symbol spaced equalizer (graph 730), and was slightly lower than the performance of the fractionally spaced equalizer (graph 710), The complexity of the improved equalizer (such as the equalizer of FIG. 2) was compared to the complexity of a fractionally spaced equalizer and a symbol spaced equalizer. The complexity (represented by the number of calculations required for calculating the taps of the equalizer) of the improved equalizer was 661 calculations, the complexity of the symbol spaced equalizer was 463 calculations and the complexity of the fractionally spaced equalizer was 1122 calculations. This complexity was obtained by performing frequency domain calculations (that required FFT transforms). It is noted that when performing time domain calculations the fractionally spaced equalizer required 2458 calculations.

These calculations were simulated under the following assumptions: the receiver has two input antennas, an oversampling ratio of 2, a channels delay spread shorter than 32 chips, the tap calculation is executed each 1280 chips on a block of 1536 chips, the equalizer uses 32 taps in time domain per diversity branch and 64 taps in frequency domain per diversity branch.

Those skilled in the art will recognize that the boundaries between logic blocks are merely illustrative and that alternative embodiments can merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the calculator can calculate the taps without diagonalizing matrixes. Yet for another example, the taps can be calculated in the time domain instead of the frequency domain and thus the FFT units and IFFT units illustrated in FIGS. 1, 2 and 3 can be removed. Yet for a further example, the descrambling/de-spreading filter can precede the fractionally spaced equalizer.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations can be combined into a single operation, a single operation can be distributed in additional operations and operations can be executed at least partially overlapping in time. Moreover, alternative embodiments can include multiple instances of a particular operation, and the order of operations can be altered in various other embodiments.

Also for example, in one embodiment, the illustrated examples can be implemented as circuitry located on a single integrated circuit or within a same device. For example, an analog to digital converter and the interpolation unit can be located on a single system on chip. Alternatively, the examples can be implemented as any number of separate integrated circuits or separate devices interconnected with each other in a suitable manner. For example, an analog to digital converter and the interpolation unit can be located on different integrated circuits.

Also for example, the examples, or portions thereof, can implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as cell phones, base stations, personal computers, media players personal digital assistants, electronic games, automotive and other embedded systems, and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for equalizing signals, the method comprises:
receiving input signals;
sampling the input signals to provide oversampled samples;
processing the oversampled samples to provide symbol spaced samples and to provide fractionally spaced samples that represent the oversampled samples;
calculating a symbol spaced autocorrelation of the symbol spaced samples;
interpolating the symbol spaced autocorrelation to provide a fractionally spaced autocorrelation;
calculating taps of a fractionally spaced equalizer based on the fractionally spaced autocorrelation;
feeding the taps to the fractionally spaced equalizer; and
filtering the fractionally spaced samples by the fractionally spaced equalizer to provide equalized samples.

2. The method according to claim 1, comprising calculating the taps of a fractionally spaced equalizer that is a half symbol spaced equalizer.

3. The method according to claim 1, comprising processing the oversampled samples without applying anti-aliasing filtering.

4. The method according to claim 1, comprising:
calculating a symbol spaced autocorrelation of the symbol spaced samples;
calculating a symbol spaced channel estimation, wherein the interpolating comprises
interpolating the symbol spaced autocorrelation and the symbol spaced channel estimation to provide the fractionally spaced autocorrelation and a fractionally spaced channel estimation, wherein the calculating the taps comprises
calculating the taps of the fractionally spaced equalizer based on the fractionally spaced autocorrelation and the fractionally spaced channel estimation.

5. The method according to claim 1, comprising:
receiving a transmitted signal by multiple antennas to provide multiple input signals; and
sampling the multiple input signals to provide the oversampled samples.

6. A method for equalizing signals, the method comprises:
receiving input signals;
sampling the input signals to provide oversampled samples;
processing the oversampled samples to provide symbol spaced samples;
calculating taps of a fractionally spaced equalizer based on the symbol spaced samples;
feeding the taps to the fractionally spaced equalizer;
anti-aliasing filtering of the oversampled samples to provide fractionally spaced samples that represent the oversampled samples; and
filtering the fractionally spaced samples by the fractionally spaced equalizer to provide equalized samples.

7. The method according to claim 6, comprising applying an anti-aliasing filter that has a time response that is substantially equal to a symbol period of an input signal that is represented by the oversampled samples.

8. The method according to claim 6, comprising:
calculating a symbol spaced autocorrelation of the symbol spaced samples;
calculating a symbol spaced channel estimation;
interpolating the symbol spaced autocorrelation and the symbol spaced channel estimation to provide a fractionally spaced autocorrelation and a fractionally spaced channel estimation, wherein the
calculating the taps of the fractionally spaced equalizer is based on the fractionally spaced autocorrelation and the fractionally spaced channel estimation.

9. A method for equalizing signals, the method comprises:
receiving input signals;
sampling the input signals to provide oversampled samples;
processing the oversampled samples to provide symbol spaced samples and to provide fractionally spaced samples that represent the oversampled samples;
calculating a symbol spaced channel estimation;
interpolating the symbol spaced channel estimation to provide a fractionally spaced channel estimations;
calculating taps of a fractionally spaced equalizer is based on the fractionally spaced channel estimation;
feeding the taps to the fractionally spaced equalizer; and
filtering the fractionally spaced samples by the fractionally spaced equalizer to provide equalized samples.

10. A receiver, comprising:
a sampling unit, for sampling input signals to provide oversampled samples;
a processing unit, coupled to the sampling unit, for processing the oversampled samples to provide symbol spaced samples and to provide fractionally spaced samples;
a fractionally spaced equalizer, coupled to the processing unit, for filtering the fractionally spaced samples to provide equalized samples;
a calculation unit for calculating a symbol spaced channel estimation;
an interpolation unit for interpolating the symbol spaced channel estimation to provide a fractionally spaced channel estimation; and
a calculator for calculating taps of the fractionally spaced equalizer based on the fractionally spaced channel estimation and for feeding the taps to the fractionally spaced equalizer.

11. The receiver according to claim 10, wherein the fractionally spaced equalizer is a half symbol spaced equalizer.

12. The receiver according to claim 11, wherein the calculator comprises:
a second calculation unit for calculating a symbol spaced autocorrelation of the symbol spaced samples, wherein the interpolation unit is for interpolating the symbol spaced autocorrelation and interpolating the symbol spaced channel estimation to provide a fractionally spaced autocorrelation and the fractionally spaced channel estimation; and
a third calculation unit for calculating the taps of the fractionally spaced equalizer based on the fractionally spaced autocorrelation and the fractionally spaced channel estimation.

13. The receiver according to claim 10, wherein processing unit is arranged to process the oversampled samples without applying anti-aliasing filtering.

14. The receiver according to claim 10, wherein the calculator comprises:
a second calculation unit for calculating a symbol spaced autocorrelation of the symbol spaced samples, wherein the interpolation unit is for interpolating the symbol spaced autocorrelation and interpolating the symbol spaced channel estimation to provide a fractionally spaced autocorrelation and the fractionally spaced channel estimation; and
a third calculation unit for calculating the taps of the fractionally spaced equalizer based on the fractionally spaced autocorrelation and the fractionally spaced channel estimation.

15. The receiver according to claim 10, comprising:
multiple input antennas for receiving a transmitted signal to provide multiple input signals; and
sampling units for sampling the multiple input signals to provide the oversampled samples.

16. A receiver comprising:
a sampling unit, for sampling input signals to provide oversampled samples;
a processing unit, coupled to the sampling unit, for processing the oversampled samples to provide symbol spaced samples, the processing unit comprising an anti-aliasing filter for anti-aliasing filtering of the oversampled samples to provide fractionally spaced samples;
a fractionally spaced equalizer, coupled to the processing unit, for filtering the fractionally spaced samples to provide equalized samples; and
a calculator for calculating taps of the fractionally spaced equalizer based on the symbol spaced samples and for feeding the taps to the fractionally spaced equalizer.

17. The receiver according to claim 16, wherein the anti-aliasing filter has a time response that is substantially equal to a symbol period of an input signal that is represented by the oversampled samples.

18. The receiver according to claim 16, wherein the calculation unit comprises:
- a first calculation unit for calculating a symbol spaced autocorrelation of the symbol spaced samples;
- a second calculation unit for calculating a symbol spaced channel estimation;
- an interpolation unit for interpolating the symbol spaced autocorrelation and interpolating the symbol spaced channel estimation to provide a fractionally spaced autocorrelation and a fractionally spaced channel estimation; and
- a third calculation unit for calculating the fractionally spaced equalizer based on the fractionally spaced autocorrelation and the fractionally spaced channel estimation.

* * * * *